Feb. 6, 1951  C. A. JOHNSON  2,540,334
SHOCK ABSORBING MECHANISM
Filed July 12, 1946  2 Sheets-Sheet 1
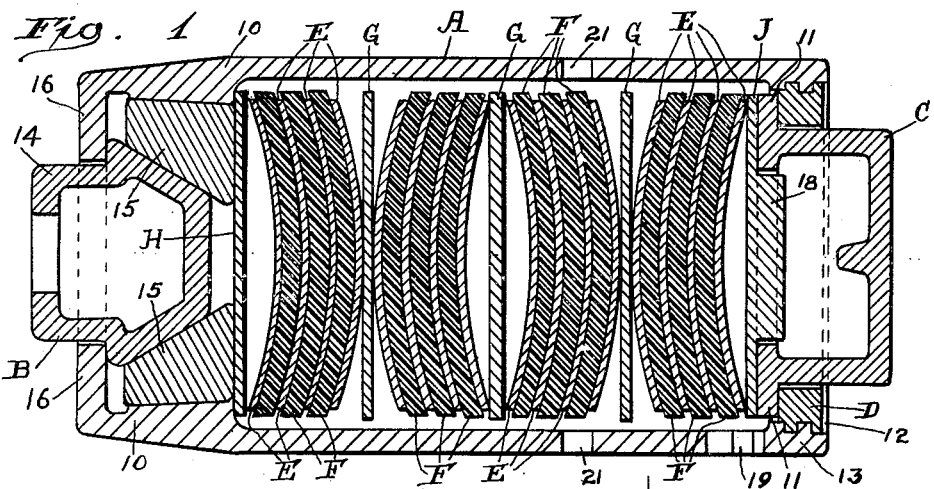
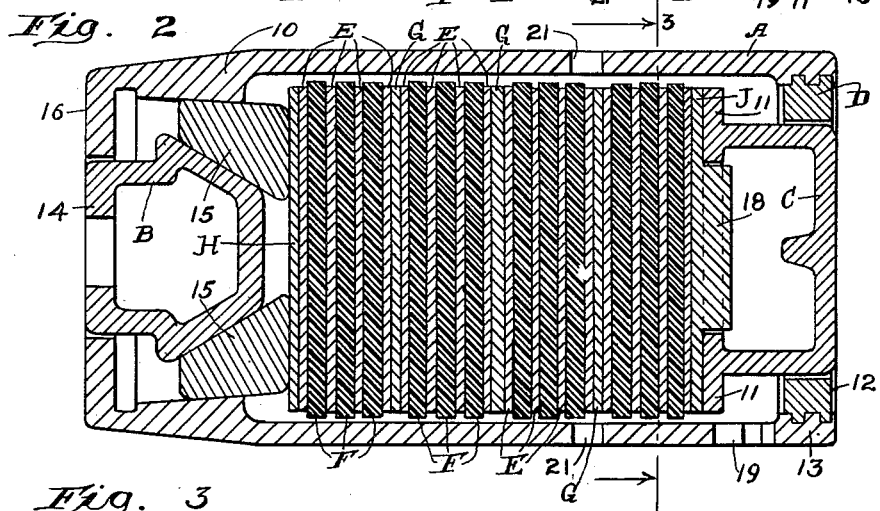
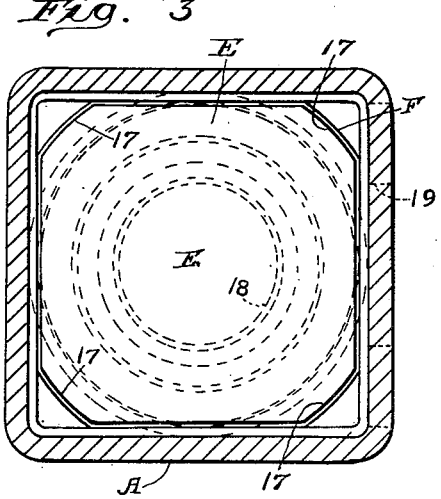
Inventor:
Clarence A. Johnson.
By Henry Fuchs
Atty.

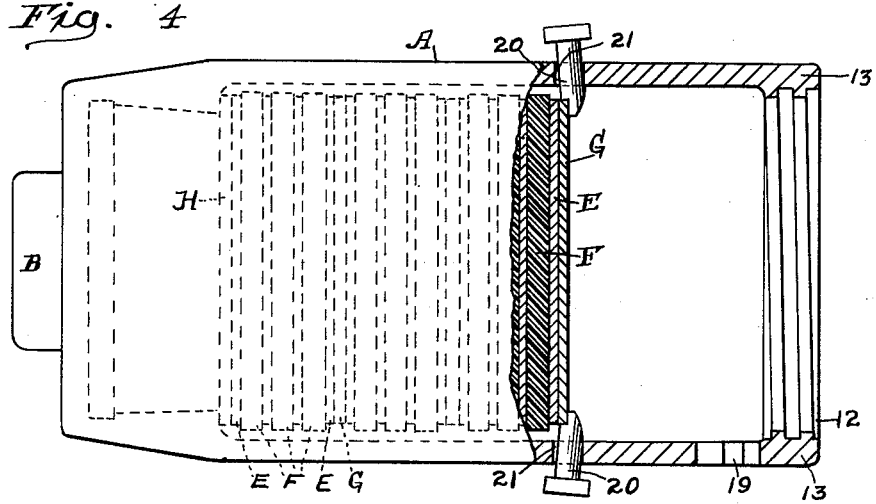
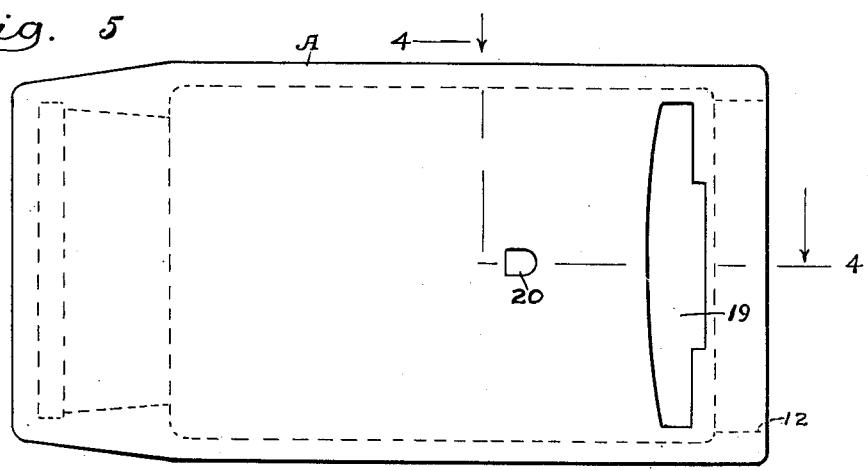
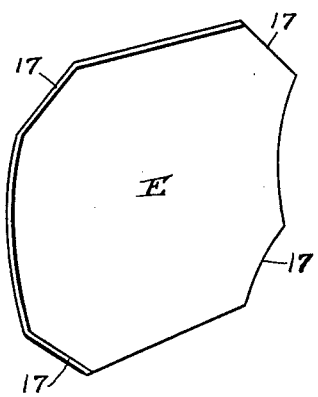

Patented Feb. 6, 1951

2,540,334

UNITED STATES PATENT OFFICE 2,540,334

SHOCK ABSORBING MECHANISM

Clarence A. Johnson, Chicago, Ill., assignor to W. H. Miner, Inc., Chicago, Ill., a corporation of Delaware Application July 12, 1946, Serial No. 683,127

4 Claims. (Cl. 213—32)

This invention relates to improvements in shock absorbing mechanisms.

One object of the invention is to provide a shock absorbing mechanism of the friction type, especially adapted for use in draft riggings for railway passenger cars, having light initial action to absorb the lighter shocks, followed by high frictional resistance to take care of the heavier shocks to which the mechanism is subjected in service, wherein the light preliminary action is produced by cushioning means comprising bowed plate springs and rubber mats alternated with the plate springs, and the high frictional resistance is produced by relatively slidable friction elements having their relative movement opposed by the same cushioning means which provides for the preliminary light action of the mechanism.

Other objects of the invention will more clearly appear from the description and claims hereinafter following.

In the drawings forming a part of this specification, Figure 1 is a horizontal, longitudinal sectional view of my improved shock absorbing mechanism. Figure 2 is a view similar to Figure 1, showing the mechanism completely compressed. Figure 3 is a vertical sectional view, corresponding substantially to the line 3—3 of Figure 2. Figure 4 is a part top plan and part horizontal sectional view of the mechanism shown in Figure 1, illustrating the manner of assembling the same. Figure 5 is a side elevational view of Figure 4. Figure 6 is a detail perspective view of one of the plate springs employed in my improved mechanism.

My improved friction shock absorbing mechanism comprises broadly a casing A; a friction clutch B; a preliminary spring cap C; a retaining-ring D for the cap; a plurality of plate springs E; a plurality of rubber pads F alternated with the plate springs, the alternated plates E and pads F being divided into a plurality of groups; spacer plates G separating the groups; a front follower plate H; and a rear follower plate J.

The casing A is in the form of a tubular member, the main body portion of which is of square, transverse cross section. At the forward or left hand end, as seen in Figure 1, the casing is provided with a friction shell section 10 of substantially hexagonal, transverse cross section within which the friction clutch B is slidingly telescoped. The rear end of the casing A slidingly accommodates the spring cap C, which is in the form of a cup-shaped member of cylindrical cross section having an annular retaining flange 11 at its inner end which shoulders against the screw threaded retaining ring D which is secured to the casing at the rear end thereof. The mechanism thus far described is well known in this art and the parts thereof are similar to the corresponding parts of the mechanism illustrated in Patent No. 2,289,348, granted to George E. Dath, July 14, 1942. The retaining ring D has threaded engagement within a circular opening 12 provided in the rear end wall 13 of the casing A, the arrangement being similar to that shown in the Dath patent.

The friction clutch B comprises a central wedge block 14 having wedging engagement with three friction shoes 15—15—15 which surround the block and are in sliding frictional engagement with the interior walls of the friction shell section 10 of the casing. This friction clutch is similar to the friction clutch employed in said Dath patent and is well known in this art, being of the general character of the friction clutch shown in Patent No. 2,050,541, granted to Roland J. Olander, August 11, 1936. The wedge block 14 has its forward movement limited by shouldered engagement with an inturned flange 16 at the front or friction shell section end 10 of the casing.

The plates E are all of the same design, each plate being in the form of a relatively thin, transversely thin, transversely curved, spring steel plate member of substantially square outline, having the corners thereof cut away, as indicated at 17.

The rubber pads F are similar in shape to the plate springs E, but are slightly larger and of greater thickness than these plate springs, as clearly shown in Figures 1 and 2.

The plate springs E and the rubber pads F are arranged in nested groups or gangs within the square portion of the casing A with the plates E and pads F of each group alternated and bowed in the same direction. As shown in Figures 1 and 2, four such groups are preferably employed, each group comprising four plates E and three rubber pads F, one of the plates E being disposed at each end of each group. In order to prevent relative edgewise displacement of the pads F with respect to the plates E, each pad is preferably vulcanized to an adjacent plate E.

In the assembled condition of the mechanism, the plates E and pads F of the different groups are arranged so that those of adjacent groups are reversely curved, as shown in Figure 1, that is, those of the first group have their concave sides facing forwardly, those of the second group have their concave sides facing rearwardly, those of the third group have their concave sides facing forwardly, and those of the fourth or rear group have their concave sides facing rearwardly. The front group bears on the follower plate H, which is substantially flat, and has bearing engagement with the inner ends of the shoes 15—15—15.

The four groups of plates and pads are separated by the spacer plates G—G—G, which are interposed respectively between the first and second, the second and third, and the third and fourth groups. The follower plate H and the spacing plates G are substantially flat and of the same general outline as the plate springs E. The rear spring follower plate J is also substantially flat and of the same general outline as the plate springs E. This follower plate J is interposed between the spring cap C and the rearmost group of the plate springs E and pads F and has a rearwardly projecting, cylindrical, central boss 18 which is seated within the cup-shaped spring cap C.

In assembling the mechanism, the wedge 14 and the shoes 15—15—15 are inserted through the rear end of the casing A, the latter being stood on its front end in upright position and supported in such a manner that the wedge is free so that it assumes the projected position shown in Figures 1 and 4. The front follower plate H and the plate springs E and pads F and the rear follower plate J are then assembled with the casing A by passing the same edgewise through a suitable opening 19 provided in the side wall of the casing, as clearly shown in Figures 1, 2, 4, and 5. The opening 19 is of the size and shape as shown in Figure 5 so as to freely admit the follower plate J and its projecting boss 18. The follower plate H and the plate springs and pads of the front three groups and the three spacer plates G having been placed within the casing A, the assembled groups are compressed as shown in Figure 4 and retained in compressed position by suitable holding pins 20—20 engaged through openings 21—21 in the side walls of the casing A to provide ample space for insertion of the plate springs and pads of the rearmost groups and the rear follower J. After the rear group and the follower plate J have been placed within the casing and the pins 20 are removed, the spring cap C is passed into the casing through the opening 12 of the rear wall 13 of the same. The mechanism is then slightly compressed and the ring D threaded into the rear end of the casing, thereby holding the mechanism assembled.

In the operation of my improved friction shock absorbing mechanism, upon movement of the usual front and rear followers of the draft rigging toward each other, the mechanism will be compressed between said followers. During the first part of the compression, the cap C is moved inwardly with respect to the casing A, thereby compressing the cushioning means comprising the plate springs E and the rubber pads F, partially flattening the plates E and also compressing the pads F to some extent. This takes care of the lighter shocks encountered in service. During this action there is no movement of the friction shoes with respect to the casing A, the frictional resistance existing between the shoes and the friction surfaces of the casing being too great to permit such movement. As the mechanism is further compressed and the cap C forced inwardly, the rear end of the casing A will be brought into engagement with the rear follower of the draft rigging, thus arresting relative movement of the cap and casing. Upon further compression of the mechanism, the friction shoes will be forced inwardly of the casing against the resistance of the bowed plate springs E and the rubber pads F, thereby providing the necessary high shock absorbing capacity required at this stage of the operation. Full compression of the mechanism is illustrated in Figure 2. As shown in Figure 2, the plate springs E and the rubber pads F have been flattened out and the pads F compressed to their full extent. When the mechanism is fully compressed, movement of the shoes inwardly of the casing is limited by engagement of the front follower of the draft rigging with the casing, whereupon the casing acts as a solid column to transmit the load, preventing undue compression of the rubber pads F. When the actuating force is reduced, the expansive action of the plate springs E and the rubber pads F restores the spring cap C, the shoes 15—15—15, and the wedge 14 to the normal full released position shown in Figure 1.

I claim:

1. In a shock absorber, the combination with a casing; of a spring cap slidingly telescoped within one end of the casing; a friction clutch slidingly telescoped within the other end of the casing; and a cushioning unit within the casing yieldingly opposing movement of the cap and clutch toward each other inwardly of the casing, said cushioning unit comprising a plurality of groups of yielding elements, each group being composed of alternately disposed, bowed plate springs and bowed rubber pads, the groups being arranged in series lengthwise of the mechanism with the plate springs and rubber pads of adjacent groups bowed in reverse directions.

2. In a shock absorber, the combination with a casing; of a spring cap slidingly telescoped within one end of the casing; a friction clutch slidingly telescoped within the other end of the casing; a flat follower plate on which said clutch bears; a second follower plate bearing on the spring cap; a plurality of groups of yielding elements within said casing, each group comprising alternately disposed, bowed plate springs and bowed rubber pads, the plate springs and rubber pads of each group being bowed in the same direction, one of said groups of elements bearing on said front follower plate, another group of said elements bearing on said second named follower plate, and the remaining groups of elements being interposed between said first and second named groups; and flat spacer plates separating said groups of elements.

3. In a shock absorber, the combination with a casing; of a spring cap slidingly telescoped within one end of the casing; a friction clutch slidingly telescoped within the other end of the casing; and a cushioning unit within said casing interposed between and yieldingly resisting relative movement of the friction clutch and spring cap toward each other inwardly of the casing, said cushioning units including a plurality of groups of elements, said groups being arranged in series lengthwise of the mechanism, each group comprising alternately disposed bowed plate springs and bowed rubber pads, and flat spacer plates and rubber pads separating said groups, the plates of adjacent groups being reversely curved.

4. In a shock absorber, the combination with a casing; of a spring cap slidingly telescoped within one end of the casing; a friction clutch slidingly telescoped within the other end of the casing; a flat follower plate on which said clutch bears; a second follower plate bearing on said spring cap; a plurality of groups of yielding elements within said casing arranged in series lengthwise of said casing, each group comprising alternately disposed, bowed plate springs and bowed rubber pads, the plate springs and rubber pads of the respectively adjacent groups of said series being bowed in reverse directions, with all of the plates and pads of each individual group bowed in the same direction, one of said groups of elements bearing on said flat follower plate, another group bearing on said second named follower plate, and the remaining groups of elements being interposed between said first and second named groups; and flat spacer plates separating said groups of elements.

CLARENCE A. JOHNSON.

REFERENCES CITED

The following references are of record in the file of this patent:

UNITED STATES PATENTS

| Number | Name | Date |
|---|---|---|
| 39,422 | Pugsley | Aug. 4, 1863 |
| 2,050,541 | Olander | Aug. 11, 1936 |
| 2,260,532 | Lindeman | Oct. 28, 1941 |
| 2,387,266 | Holland | Oct. 23, 1945 |